United States Patent
Lewin et al.

(10) Patent No.: US 11,720,699 B2
(45) Date of Patent: Aug. 8, 2023

(54) INLINE FILE DOWNLOAD CONTROLS IN REMOTE BROWSER ISOLATION SYSTEM

(71) Applicant: Microsoft Technology Licensing, LLC, Redmond, WA (US)

(72) Inventors: Guy Lewin, New York City, NY (US); Vitaly Khait, Yavne (IL); Alexander Esibov, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 114 days.

(21) Appl. No.: 17/122,649

(22) Filed: Dec. 15, 2020

(65) Prior Publication Data
US 2022/0188438 A1    Jun. 16, 2022

(51) Int. Cl.
*G06F 21/62* (2013.01)
*H04L 29/06* (2006.01)
*H04L 29/08* (2006.01)
*H04L 9/40* (2022.01)
*H04L 67/06* (2022.01)

(52) U.S. Cl.
CPC ...... *G06F 21/6218* (2013.01); *H04L 63/0281* (2013.01); *H04L 63/20* (2013.01); *H04L 67/06* (2013.01)

(58) Field of Classification Search
CPC ...... G06F 21/6218; G06F 21/62; G06F 21/60; H04L 63/0281; H04L 63/20; H04L 67/06
USPC .......................................................... 726/1
See application file for complete search history.

(56) References Cited

U.S. PATENT DOCUMENTS

| | | | | |
|---|---|---|---|---|
| 2007/0033517 A1* | 2/2007 | O'Shaughnessy | ...... | H04L 67/55 715/255 |
| 2013/0212686 A1* | 8/2013 | Palaniappan | ........... | H04L 67/60 709/219 |
| 2015/0046214 A1* | 2/2015 | Jain | .................... | G06Q 30/0201 705/7.29 |
| 2016/0057228 A1* | 2/2016 | Yasaki | .................... | G06F 21/62 709/213 |
| 2016/0154539 A1* | 6/2016 | Buddhiraja | ........... | G06F 3/0481 715/738 |
| 2018/0159896 A1 | 6/2018 | Soman et al. | | |
| 2019/0158531 A1 | 5/2019 | Giura et al. | | |

(Continued)

OTHER PUBLICATIONS

"International Search Report and Written Opinion Issued in PCT Application No. PCT/US21/060428", dated Mar. 14, 2022, 12 Pages.

*Primary Examiner* — Ruolei Zong
(74) *Attorney, Agent, or Firm* — Weaver IP L.L.C.

(57) ABSTRACT

A file is enabled to be downloaded from a web server on behalf of a client browser, via an isolated browser of an RBI server. An isolated browser engine detects the file download and notifies an isolated browser controller. The isolated browser controller determines whether the file download is permitted. Responsive to determining that the file download is not permitted, the file is deleted at the RBI server and a policy event is transmitted to the client browser. Responsive to determining that the file download is permitted, the file is transmitted to the client browser. The file may be streamed to the client browser, or it may be published via an independent web server and a notification is transmitted to the client browser. The client browser is controlled to issue a request to the independent web server to download the file to the client browser.

20 Claims, 7 Drawing Sheets

(56) References Cited

U.S. PATENT DOCUMENTS

2019/0266328 A1\* 8/2019 Waldman .............. G06F 21/566
2020/0145515 A1  5/2020 Fleck
2022/0109700 A1\* 4/2022 Guruswamy ........... H04L 67/06

\* cited by examiner

INLINE FILE DOWNLOAD CONTROLS IN REMOTE BROWSER ISOLATION SYSTEM

BACKGROUND

Remote browser isolation (RBI) provides an effective solution for secure web gateways. An RBI platform may include a remote isolated browser. A client browser is controlled to communicate with the remote isolated browser to perform browsing operations for the client browser. After browsing to a web page for a client browser, an RBI platform may serve a rendering of the web page to the client browser but may not serve the web page itself so that malware or viruses of the web page are unable to reach the client device. For example, the RBI platform may create an isolated browser session that connects to the web page on a web server and loads the content onto the remote isolated browser. The RBI platform may render the web content and stream it to the client browser (e.g., an end user's native browser of the client device) as pixel data and the client browser may display pixels corresponding to the pixel data as an image of the web page. In this manner, the execution of browsing activity may be moved away from a user's computer to a remote server comprising the RBI platform. This remote server can be hosted in the cloud or may be located on-premise within an organization's network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods performed by a first computer program executing on a computing device, and systems that are configured to perform such methods, are described herein. In one aspect, a method is performed in a server and comprises downloading a file on behalf of a client browser via an isolated browser of the server. An indication of detection, of the download of the file by a browser engine of the isolated browser, is received from the browser engine. The downloaded file is saved at the server. Whether the file is permitted for download by the client browser is determined. Responsive to determining that the file is not permitted for download by the client browser, the downloaded file is deleted at the server, and a policy event is transmitted to the client browser. Responsive to determining that the file is permitted for download by the client browser, the downloaded file is transmitted to the client browser.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
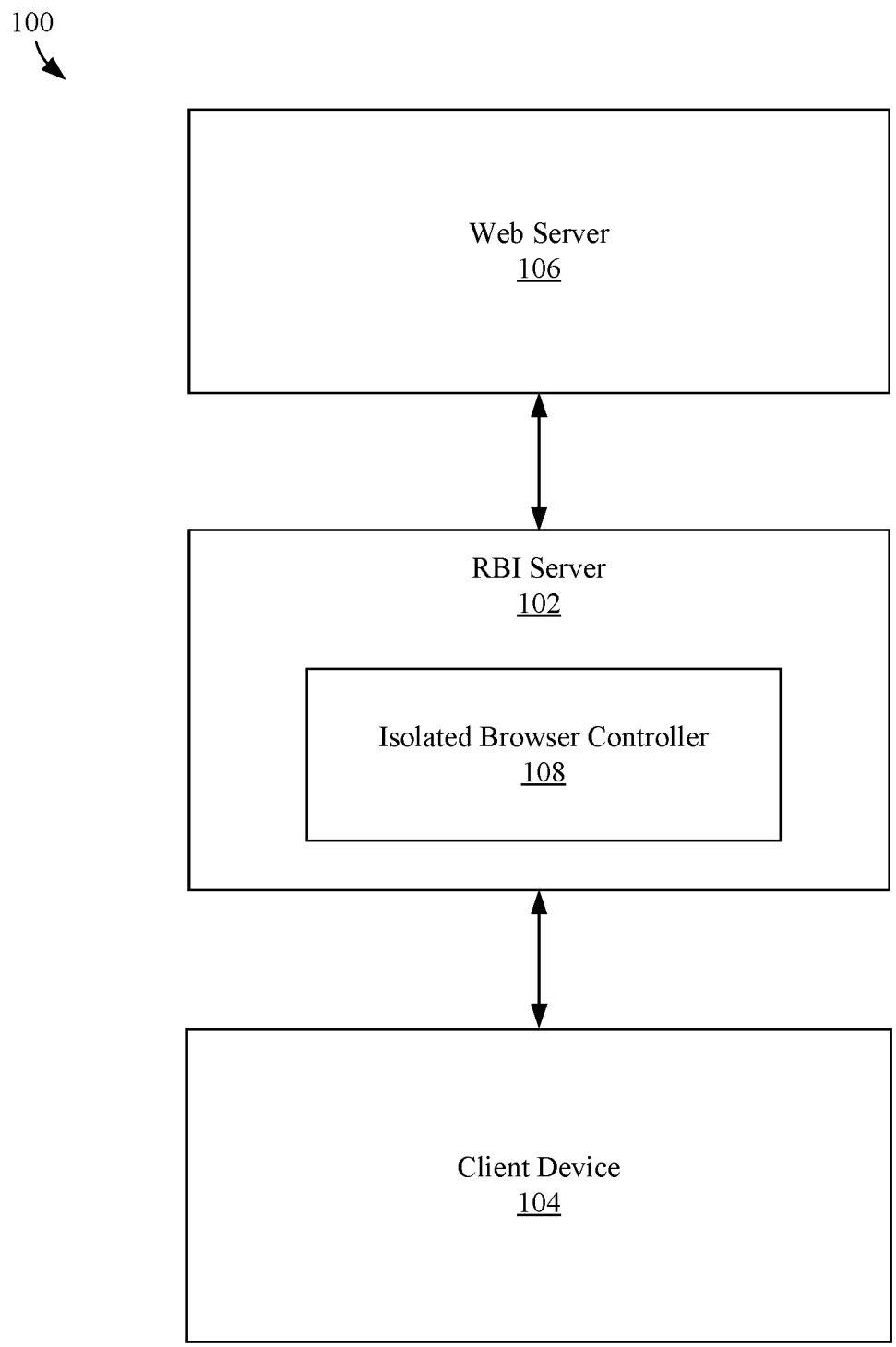
FIG. 1 is a block diagram of an system including an remote browser isolation (RBI) server with a browser controller for controlling or blocking file downloads from a web server for a client browser, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In general, a proxy server may be coupled as a web gateway between a client device and a web server. A user at the client device may try to browse to an application (e.g., webmail) on the web server and instead of going directly to the web server, their request may go first to a proxy server that has its own domain. The proxy server may be configured to receive traffic such as the request from the client device, apply certain policies on that traffic, and if the traffic is approved, the proxy server may forward the traffic to the target service provider that hosts the web application. The proxy system is tasked with monitoring the user's traffic to ensure that the user remains within the proxy server's session and does not connect directly to the web server application. However, implementing the process of making sure that the user stays within the proxy server's session may involve a tremendous amount of engineering and code. For example, the proxy server may need to modify content received from the web application and wrap the content in a way that keeps the user within the proxy's session. Furthermore, it may be necessary to develop significant amounts of JavaScript code (and/or other code) for executing this process because of the way that browsers work and the complexities of JavaScript and web communications.

Another problem with proxy servers is that users who browse to a web server via a proxy may receive all of the content provided by the web server at their client device. This may cause problems with respect to security. For instance if a user browses to a certain web application through a proxy server, the proxy server may deliver the content (e.g., text of a page or a document) to the user's client device. In this case, the user may be able to copy and paste the content to another document or to an email message for example. Moreover, a browser at the client device may save the text or a confidential document in a cache for performance purposes. This practice may pose a serious security risk because even though a security proxy server is in place to ensure this data doesn't go elsewhere, the browser at the client device may still keep the document cached, such that confidential data or downloaded document files are still at risk even while going through this proxy. For example, users may browse to a company's webmail application to view confidential email. The company may set up a proxy server but if the web mail application sends confidential data to a client device, once it is received, the browser of the client device may save it as cache data or the user may be allowed copy and paste it somewhere else. In other words, once it appears at the client's browser, it is available to the user and/or stored in cache and can be easily exported even though the company didn't intend for this to happen. As for detecting file downloads (e.g., detecting downloading a of file such as a portable document format (PDF) document or another file from a web server), significant engineering and/or code development that implements heuristic methods (e.g., a heuristic engine) may be needed to determine whether a file download is occurring (e.g., by parsing content headers and calculating which type of browser is currently in use). Presently there are no standards for defining file downloads in different browsers.

Data exfiltration is a form of a security breach that occurs when data is copied, transferred, or retrieved from a computer or server without authorization. A content provider (e.g., a company) may wish to allow users to view data, such as email or web pages on a client browser in a client device, while limiting their capability to copy or save the data locally in a cache. To reduce data exfiltration a remote browser isolation (RBI) platform may be utilized in a proxy server to provide an effective solution for web gateways. An RBI server may comprise a reverse proxy that goes beyond the role of a hypertext transfer protocol (HTTP) proxy server that changes hypertext markup language (HTML) in JavaScript and sends HTTP traffic to a client browser. An RBI server may convert HTML, JavaScript, and/or cascading style sheets (CSS) (e.g., whatever is used to build a web page) into pictures and transmit only the pixels (pixel data) of the pictures to the client browser. In other words, instead of transmitting the content of a web page, which can be copied and/or stored via the client browser, the RBI server may transmit only pixel data that forms images of what the content looks like when displayed. In this manner, the content of a webpage itself is not received at the client browser and cannot be saved or copied. User interactions, for example, mouse clicks or touch screen input, with the pixel display may be detected at x, y locations (coordinates) on a screen, and may be sent to the RBI server. The locations may be mapped to control elements of the corresponding webpage and sent to the web server by the RBI server. As a result, the client browser may not communicate directly with the web server. The RBI server may even be used to scroll up or down in a pixel rendition of the web page at the client browser.

As described above, after browsing to a web page for a client device, an RBI server including an isolated browser may serve a rendering of the web page (e.g., pixels of a picture, a stream of pixels, instructions for rendering a picture, etc.) to a browser in the client device, but may not serve the web page itself so that malware or viruses of the web page are unable to reach the client device. The present disclosure describes an RBI server with a mechanism for (1) detecting file downloads performed by the isolated browser of the RBI server (e.g., where the isolated browser performs the file downloads on behalf of a client device browser), (2) executing policies (if any) concerning downloading the file to the client browser, and (3) forwarding either the downloaded file or a download block notification to the browser of the client device (e.g., as if in response to a native request made from the client browser). In contrast, suffix proxies or other proxy solutions may routinely pass a file that is downloaded from a web server to a client browser in the case of a client-side file download request (e.g., a download initiated by JavaScript of the client browser). Also, instead of heuristically trying to understand if a file download occurred, the isolated browser engine may be configured to monitor for file downloads and call a function to report to an isolated browser controller when a file download is detected. By using the isolated browser engine to detect a file download for a client browser, file download detection may be implemented efficiently with fewer code instructions and fewer processing cycles than may be required in other proxy solutions. Moreover, by controlling access to downloaded files by a client browser rather than allowing downloads to occur by default, the present disclosure provides greater control in preventing data exfiltration.

In some embodiments, isolated browsers may run in a cloud based system. When a user attempts to browse to a web application (e.g., webmail) on a web server device in the cloud, the browser in their client device may connect to a service of the cloud based system and the cloud based service may assign the browser of the client device to an isolated browser in the cloud. The isolated browser in the cloud may perform the actual browsing with the web application on behalf of the client browser. The isolated browser may be configured to stream a rendered web page display back to the client browser (e.g., as pixels, rendering instructions, etc.). As described above, instead of having to heuristically determine if a file download occurred, a browser engine in the isolated browser may be configured to monitor for file downloads and call a function to report when a file download has been detected. Reporting detection of a file download is more efficient than heuristically determining when a download occurs, at least because fewer code instructions and fewer processing cycles are used when the detection is reported. For example, organizations may control what a user (e.g., an employee) can do with respect to cloud based applications based on file download detection and file download policy enforcement (e.g., rules for allowing or blocking the downloading of a file from a cloud application or web application). If an organization wants to prevent certain users from saving files from a cloud application, a policy may be configured in the RBI server to mitigate such activity. For example, isolated browser software may be configured to report file downloads and the RBI server may determine whether or not to allow the file to be further downloaded to the client device browser. If a user that does not have permission to download a file receives an email with a PDF file attached, the RBI server may block downloading the PDF file to the user's client device.

Embodiments for inline file download controls in remote browser isolation systems may be implemented in various ways. For example, FIG. 1 is a block diagram of an system 100 for controlling or blocking file downloads from a web server for a client browser, according to an example embodiment. As shown in FIG. 1, system 100 includes a remote browser isolation (RBI) server 102, a client device 106, and a web server 106. RBI server 102 includes an isolated browser controller 108. System 100 is described in detail as follows.

As described in more detail below with respect to FIG. 13, remote browser server 102, client device 106, and web server 106 may each comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a dual screen phone; a Microsoft® Windows phone, etc.), a wearable computing device (e.g., a head-mounted device including smart glasses such as Google® Glass™ Oculus Rift® by Oculus VR, LLC, etc.), a gaming console/system (e.g., Nintendo Switch®, etc.), an appliance, a set top box, etc.

RBI server 102 may comprise a proxy server that is communicatively coupled to each of client device 104 and web server 106 over any suitable communication medium (e.g., wired, wireless, optical, etc.). For example, RBI server 102, client device 104, and web server 106 may communicate over one or more networks, such a local area network (LAN), such as a wireless LAN (WLAN), and/or a wide area network (WAN), such as the Internet. RBI server 102 may be configured to execute and control a browser to browse to resources that a user tries to browse to from client device 104, and communicate with client device 104 to transmit video and/or a stream of pixels. For example, RBI server 102 may be configured to, among other things, receive an HTTP request from client device 104 for accessing resources such as web applications hosted by web server 106, create an isolated browser session with web server 106, and transmit corresponding HTTP requests to the web server 106 on behalf of client device 104. RBI server 102 may also be configured to receive HTTP responses from web server 106, load content from the resources onto the RBI server 102, and transmit rendered content (e.g., as a stream pixels) to a native browser of client device 104. In other words, execution of browsing activity is moved from client device 104 to RBI server 102. RBI server 102 may be hosted, for example, in the cloud or located on-premise within an organization's network. RBI server 102 may comprise isolated browser controller 108 that may be configured to, among other things, monitor and control file downloads requested by client device 104 for files served by web server 106.

Client device 104 may be a user device comprising a web browser (i.e., client browser) for accessing information via a network (e.g., on the World Wide Web) and displaying content in a web page. Client device 104 may be configured to communicate via a network with RBI server 102 using HTTP to access web services or resources of web server 106. For example, client device 104 may be configured to receive web content that originated from web server 106 and has been converted to video or a stream of pixels at RBI server 102. The client browser of client device 104 may render the web content using, for example, JavaScript and HTML. Client device 104 may also be configured to request and download files from web server 106 via RBI server 102.

Web server 106 may be configured to store, process, and deliver web pages that may comprise HTML documents with scripts, style sheets, images, and/or text to RBI server 102. Web server 106 may host web applications that may be accessed by RBI browser 102 on behalf of client device 104 (e.g., webmail, on line retail sales, online banking, etc.) and may provide web services to client device 104 via RBI server 102. Web server 106 may also be configured to download files (e.g., PDF files, image files, etc.) to RBI server 102. For example, web server 106 may be configured to process incoming network requests from RBI server 102, on behalf of client device 104, over HTTP and other related protocols. Web server 106 may also be configured to receive content from RBI server 102 on behalf of client device 104 such as submitted web form data or uploaded files.

Figure 2:
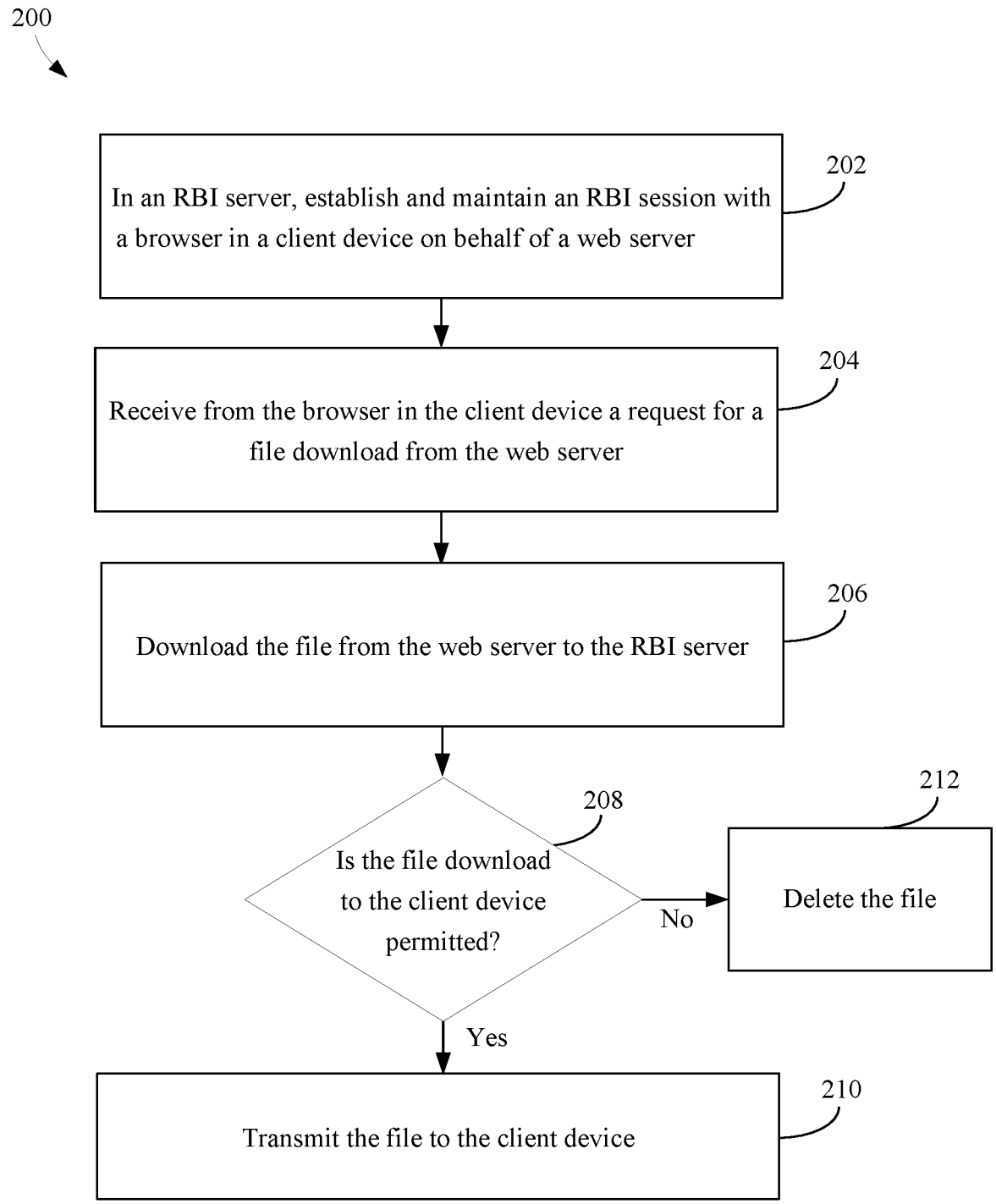
FIG. 2 is a flowchart of a method in an RBI server for controlling file downloads to a client browser, according to an example embodiment.

The RBI server 102 may operate in various ways to perform its functions. For instance, FIG. 2 is a flowchart 200 of a method in an RBI server for controlling file downloads to a client browser, according to an example embodiment. In an embodiment, RBI server 102 may operate according to flowchart 200. Flowchart 200 is described as follows with reference to FIGS. 1 and 3.

Figure 3:
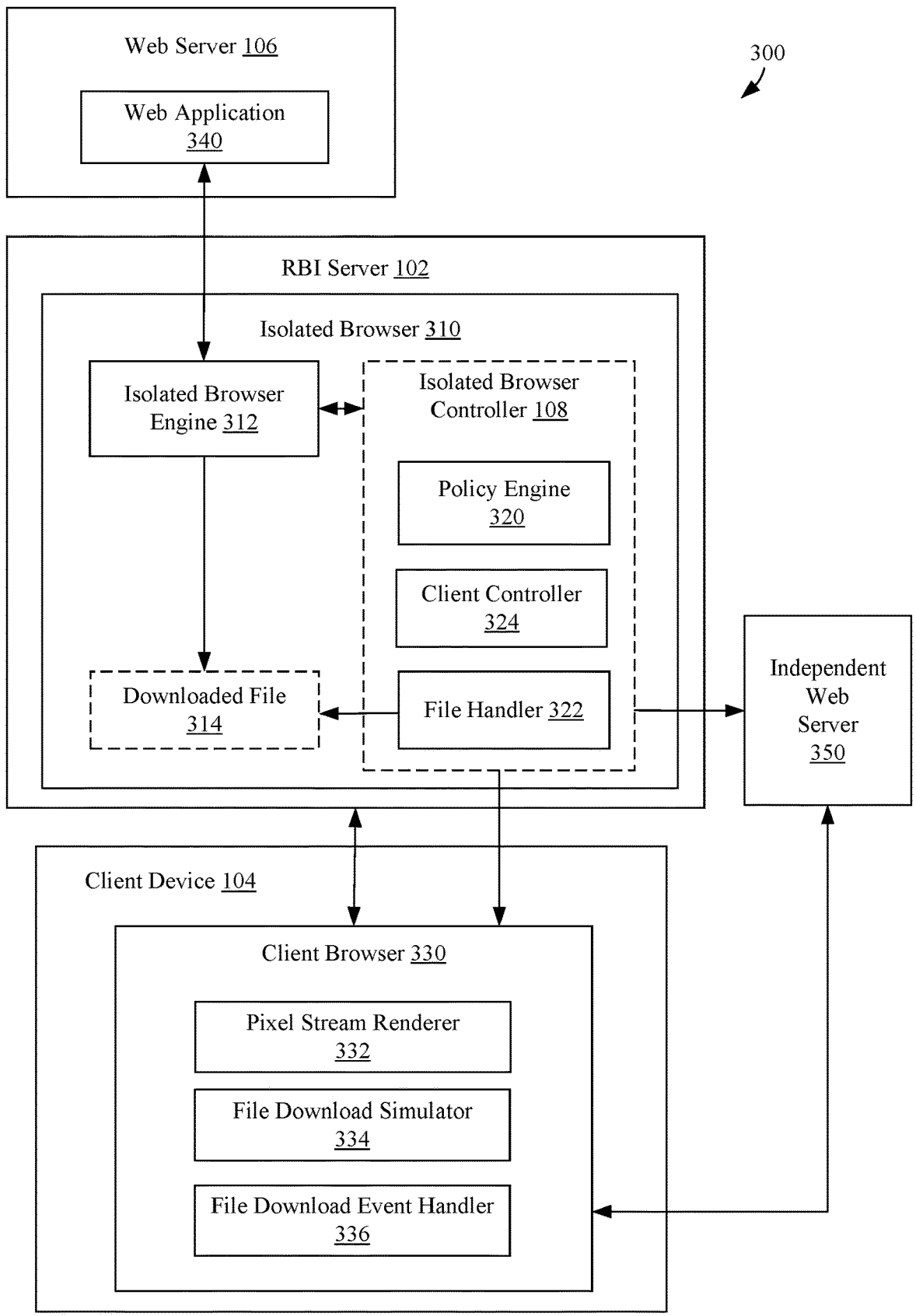
FIG. 3 is a block diagram of a system including an RBI server with a browser controller for controlling or blocking file downloads from a web server for a client browser, according to an example embodiment.

FIG. 3 is a block diagram of a system 300 including an RBI server with a browser controller for controlling or blocking file downloads from a web server for a client browser, according to an example embodiment. As shown in FIG. 3, system 300 comprises remote browser isolation (RBI) server 102, client device 104, web server 106, and independent web server 350. RBI server 102 includes an isolated browser 310. Isolated browser 310 includes isolated browser controller 108 and an isolated browser engine 312. Isolated browser controller 108 includes a policy engine 320, a client controller 324, and a file handler 322. Client device 104 includes a client browser 330. Client browser 330 includes a pixel stream renderer 332, a file download simulator 334, and a file download event handler 336. Web server 106 includes a web application 340. In some embodiments system 300 may be implemented in system 100. For purposes of illustration, system 300 is described in detail as follows with respect to flowchart 200 of FIG. 2.

Client browser 330 and RBI server 102 may communicate over one or more channels. In one embodiment, client browser 330 may communicate with RBI server 102 over a single channel. Alternatively, or in addition, client browser 330 may communicate via one or more channels to one or more of isolated browser 310, isolated browser controller 108, or isolated browser engine 312.

In some embodiments, isolated browser controller 108 may be configured to configure operational parameters of isolated browser engine 312. For example, isolated browser controller 108 may configure isolated browser engine 312 to detect file downloads from web server 106 and/or web application 340 and report the detected file downloads to isolation browser controller 108. In another example, browser controller 108 may configure isolated browser engine 312 to report information about downloaded file 314 such as its file name and where it can be retrieved from (e.g., from memory, in a file system, and/or a local disk). In other embodiments, isolated browser engine 312 may be compiled and engineered to report the detected file downloads and/or the information about downloaded file 314 to isolated browser controller 108.

Although isolated browser engine 312 and isolated browser controller 108 are shown as being separate where isolated browser engine 312 is communicatively coupled to web server 106 and isolated browser controller 310, and is configured to store downloaded file 314, in some embodiments, isolated browser controller 108 may be integrated with isolated browser engine 312. For example, isolated browser engine 312 may comprise an off-the-shelf browser engine (e.g., Google Chrome®, Microsoft Edge®, etc.) and isolated browser controller 108 may be separate and communicate with isolated browser engine 312 to control functions performed by isolated browser engine 312 as described herein. In other embodiments, isolated browser engine 312 may comprise all or a portion of isolated browser controller 108 such that functions described herein with respect to isolated browser controller 108 may be performed by isolated browser engine 312.

Flowchart 200 begins with step 202. In step 202, in an RBI server, an RBI session is established and maintained with a browser in a client device on behalf of a web server. For example, RBI server 102 may be configured to receive an HTTP request from client device 104. The HTTP request may request access to content provided by web application 340 (e.g., a webmail web page) that is provided by web server 106. Isolated browser controller 108 may or may not evaluate the HTTP request against access policies. If allowed, isolated browser controller 108 may control isolated browser engine 312 to create an isolated browser session, connect to web application 340, and load the requested web page onto the remote isolated browser 310. Isolated browser engine 312 may render the web page and convert the webpage (e.g., HTML, JavaScript, CSS, etc.) to pixels. RBI server 102 may stream the pixels (e.g., over HTML5, Unreal Engine™, etc.) to client browser 330. Client browser 330 may receive the streamed pixels from RBI server 102 and pixel stream renderer 332 may render the received pixels and display the pixels to form an image of the rendered web page. RBI server 102 may also transmit JavaScript code to capture user interactions with the displayed pixels in client browser 330. Alternatively, or in addition, rather than streaming pixels, RBI server 102 may transmit instructions for rendering the web page to client browser 330 and client browser 330 may render the web page based on the instructions. Other methods may be utilized by RBI server 102 for serving a rendering of the web page to client browser 330.

Referring again to FIG. 2, in step 204, the RBI server may receive from the browser in the client device a request for a file download from the web server. In an embodiment, RBI server 102 may be configured to receive from client browser 330 a request for a file download (e.g., for a PDF file, a text file, an image file, etc.) from web application 340 (e.g., the request may be triggered as a result of a user clicking on a link in the rendered web page, entering a different URL, etc.).

In step 206, the file is downloaded from the web server to the RBI server. For example, isolated browser engine 312 may be configured to establish or maintain a session with web application 340 and download a file from web application 340 based on the request from client browser 330. Isolated browser engine 312 may be configured to store downloaded file 314 in, for example, a file system of a local disk of RBI server 102, another storage device, and/or downloaded file 314 may be held in volatile memory (e.g., described in more detail with respect to FIG. 13).

Isolated browser engine 312 may transmit an event to isolated browser controller 108 indicating that the download of downloaded file 314 was detected, and may provide additional information to isolated browser controller 108. For example, isolated browser engine 312 may identify where downloaded file 314 is stored, its file name (e.g., a file name indicated by web server 106), and/or a domain of web application 340. Isolated browser controller 108 may also maintain information regarding the session with client browser 330, such as an identifier of the user that requested the file and/or the domain of web application 340 that was identified by the client browser for browsing.

In step 208, in instances where the file download to the client device is permitted, the method proceeds to step 210. For example, isolated browser controller 108 may be configured to determine that downloading downloaded file 314 to client browser 330 is permitted. This decision may or may not be determined based on a policy.

In step 210, the file may be downloaded to the client device. For example, if isolated browser controller 108 determines that downloading downloaded file 314 to client browser 330 is permitted, isolated browser controller 108 and/or isolated browser engine 312 may be configured to download downloaded file 314 to client browser 330.

In step 208, in instances where the file download is not permitted, the method proceeds to step 212. For example, isolated browser controller 108 may be configured to determine that downloading downloaded file 314 to client browser 330 is not permitted. This decision may or may not be determined based on a policy.

In step 212, the file may be deleted. For example, if isolated browser controller 108 determines that downloading downloaded file 314 to client browser 330 is not permitted, isolated browser controller 108 and/or isolated browser engine 312 may be configured to delete downloaded file 314.

In some embodiments, downloaded file 314 may be downloaded to client browser 330 by default, unless isolated browser controller 108 determines that the download to client browser 330 is not permitted. In other embodiments, downloaded file 314 may be deleted by default, unless isolated browser controller 108 determines that the download to client browser 330 is permitted.

Figure 4:
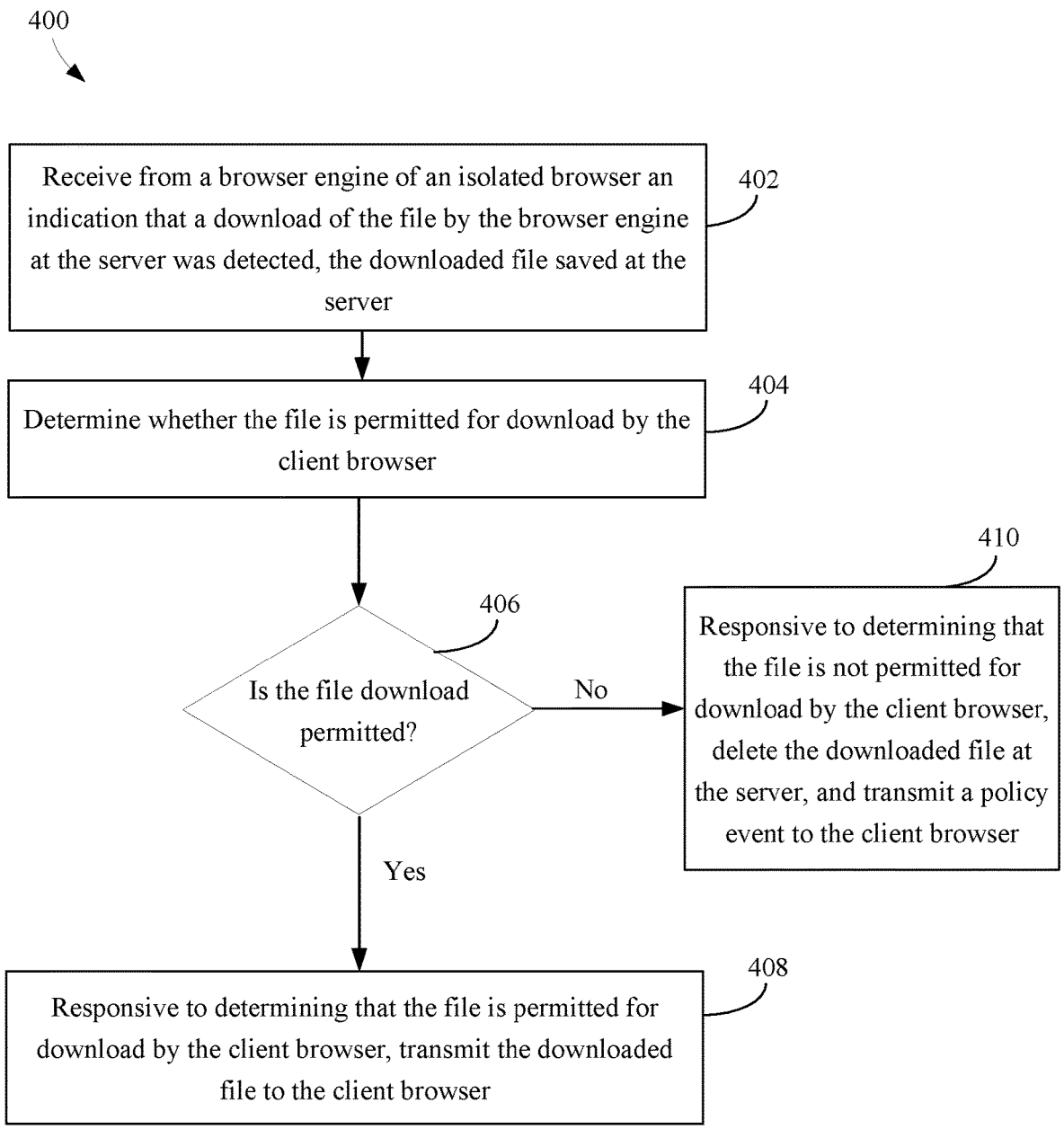
FIG. 4 is a flowchart of a method in an RBI server for controlling file downloads to a client browser, according to an example embodiment.

RBI server 102 may operate in various ways to perform its functions. For instance, FIG. 4 is a flowchart 400 of a method in an RBI server for controlling file downloads to a client browser, according to an example embodiment. In an embodiment, RBI 102 may operate according to flowchart 400. Flowchart 400 is described as follows with reference to FIGS. 1 and 3.

Flowchart 400 begins with step 402. In step 402, an indication is received from a browser engine of the isolated browser, that a download of the file by the browser engine at the server was detected, where the downloaded file is saved at the server. As described above, isolated browser engine 312 may be configured to download a file from web application 340 based on the request from client browser 330. Isolated browser 312 may be configured to store downloaded file 314, for example, in a file system of a local disk of RBI server 102, in another storage device, and/or downloaded file 314 may be held in volatile memory. Isolated browser engine 312 of RBI server 102 may be configured to monitor for file downloads, detect file downloads, and call a function to transmit a notification to isolated browser controller 108 indicating that the download of the file was detected. Isolated browser controller 108 may be configured to receive the notification.

In step 404, it is determined whether the file is permitted for download by the client browser. For example, policy engine 320 may be configured to determine whether a download of downloaded file 314 to client browser 330 is permitted (e.g., whether to allow or block downloading of a file to client browser 330). In some embodiments, a policy may be configured in isolated browser 310 for determining whether or not isolated browser controller 108 may download a file, which originated from web server 106, to client browser 330. In some embodiments, a user (e.g., an administrator) may configure isolated browser 310 with download policy parameters. File download policies may depend on a variety of criteria. For example, permission to download downloaded file 314 to client browser 330 may depend on permissions associated with: a user, a file type (e.g., indicated by filename or file extension), or the originating web server (e.g., indicated by a domain of a web application that the downloaded file originated from, such as a domain name of web application 340). However, in some embodiments, policies may not be utilized to allow or block downloads to client browser 330. For example, file downloads to client browser 330 may be allowed or denied by default.

In step 406, in instances when the file download is permitted, the method proceeds to step 408. For example, in instances where policy engine 320 determines that downloading of downloaded file 314 to client browser 330 is permitted, the method proceeds to step 408.

In step 408, responsive to determining that the file is permitted for download by the client browser, the downloaded file is transmitted to the client browser. For example, in response to policy engine 320 determining that downloading of downloaded file 314 to client browser 330 is permitted, file handler 322 may be configured to transmit downloaded file 314 to client browser 330.

In step 406, in instances when the file download is not permitted, the method proceeds to step 410. For example, in instances where policy engine 320 determines that downloading of downloaded file 314 to client browser 330 is not permitted, the method proceeds to step 410.

In step 410, responsive to determining that the file is not permitted for download by the client browser, the downloaded file at the server is deleted, and a policy event is transmitted to the client browser. For example, in response to policy engine 320 determining that downloading of downloaded file 314 to client browser 330 is not permitted, file handler 322 may be configured to delete downloaded file 314. In some embodiments, isolated browser controller 108 may transmit a policy event to client browser 330. The policy event may indicate to client browser 330 that their request for downloading a file (e.g., downloaded file 314) has been denied and/or the file download has been blocked).

By using the isolated browser engine 312 for detecting file downloads for client browser 330, file download detection may be implemented efficiently with fewer code instructions and fewer processing cycles than may be required in a heuristic engine. Moreover, by controlling access to downloaded file 314 by a client browser 330 rather than allowing downloads to occur by default, the present disclosure provides greater control in preventing data exfiltration. For example, isolated browser controller 108 may deny access to sensitive information such that the information may not be displayed in client browser 330 or stored in cache on client device 104 and a user may not copy or distribute the sensitive information.

Figure 5:
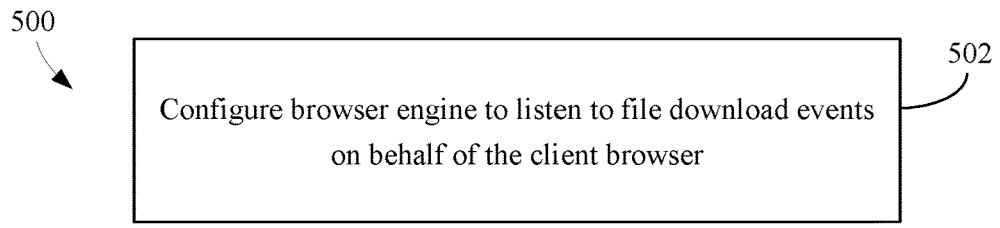
FIG. 5 is a flowchart of a method for configuring an isolated browser engine for detecting file downloads from a web server, according to an example embodiment.

Isolated browser controller 108 may operate in various ways to perform its functions. For instance, FIG. 5 is a flowchart 500 of a method for configuring an isolated browser engine for detecting file downloads from a web server, according to an example embodiment. Flowchart 500 may be performed as part of flowchart 400 (FIG. 4), such as before step 402. In an embodiment, isolated browser controller 108 may operate according to flowchart 500. Flowchart 500 is described as follows with reference to FIGS. 1 and 3.

Flowchart 500 includes step 502. In step 502, the browser engine is configured to listen to file download events on behalf of the client browser. For example, isolated browser controller 108 may be configured to configure isolated browser engine 312 to listen for file downloads (e.g., a file downloaded from web application 340). In instances when isolated browser engine 312 detects a file download, isolated browser engine 312 may be configured to call a function that reports the detected file download to isolated browser controller 108. As described above, fewer code instructions and fewer processing cycles are utilized by isolated browser engine 312 to detect and report file downloads as compared to heuristically determining whether a file has been downloaded from a web application.

Figure 6:
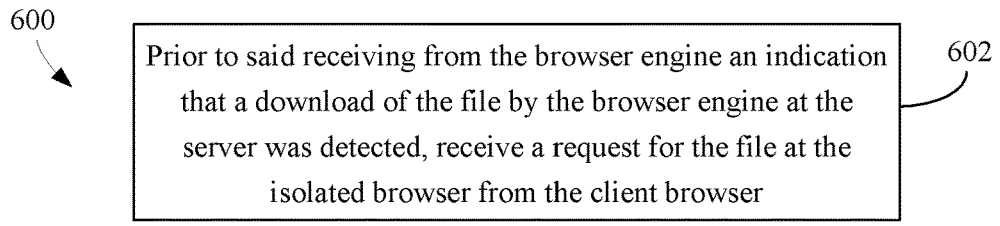
FIG. 6 is a flowchart of a method for receiving a request for a file at an isolated browser from a client browser, according to an example embodiment.

Isolated browser 310 may operate in various ways to perform its functions. For instance, FIG. 6 is a flowchart 600 of a method for receiving a request for a file at an isolated browser from a client browser, according to an example embodiment. Flowchart 600 may be performed as part of flowchart 400 (FIG. 4), such as before step 402. In an embodiment, isolated browser 310 may operate according to flowchart 600. Flowchart 600 is described as follows with reference to FIGS. 1 and 3.

Flowchart 600 includes step 602. In step 602, prior to receiving from the browser engine an indication that a download of the file by the browser engine at the server was detected, a request is received for the file at the isolated browser from the client browser. For example, isolated browser controller 108 may be configured to receive an HTTP request from client browser 330. The HTTP request may indicate a file for download from a particular resource such as web application 340 (e.g., a PDF file, image file, Word file, etc.). Subsequently, browser engine 312 may transmit a request for the indicated file to web application 340, receive the requested file from web application 340, and transmit an indication to isolated browser controller 108 that download of the file (e.g., of downloaded file 314) was detected at RBI server 102.

Figure 7:
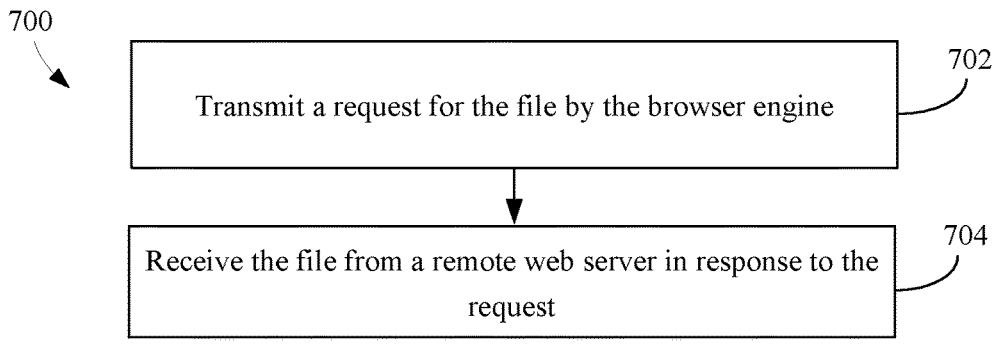
FIG. 7 is a flowchart of a method for requesting a file download by an isolated browser engine, according to an example embodiment.

Isolated browser engine 312 may operate in various ways to perform its functions. For instance, FIG. 7 is a flowchart 700 of a method for requesting a file download by an isolated browser engine, according to an example embodiment. Flowchart 700 may be performed as part of flowchart 400 (FIG. 4), such as before step 402. In an embodiment, isolated browser engine 312 may operate according to flowchart 700. Flowchart 700 is described as follows with reference to FIGS. 1 and 3.

Flowchart 700 begins with step 702. In step 702, the browser engine may transmit a request for the file. For example, isolated browser engine 312 may be configured to transmit a request for a file from web application 340 on behalf of client browser 330. As described above, isolated browser controller 108 may receive an HTTP request from client browser 330 for a file from web application 340. In response, isolated browser controller 108 may be configured to control isolated browser engine 312 to transmit an HTTP request to web application 340 for the requested file on behalf of client browser 330. In other embodiments, client browser engine 312 may be configured to receive the HTTP request from client browser 330 and in response transmit a corresponding HTTP request to web application 340 for the requested file on behalf of client browser 330.

In step 704, the file from a remote web server is received in response to the request. For example, web application 340 may be configured to transmit the file to isolated browser engine 312 in an HTTP response to the request. Isolated browser engine 312 may be configured to receive the requested file from web application 340. Isolated browser engine 312 may also be configured to store the downloaded file as downloaded file 314 in, for example, a file system of a local disk of RBI server 102, another storage device. Alternatively or in addition, downloaded file 314 may be held in volatile memory at RBI server 102. Isolated browser engine 312 may be configured to transmit an event to isolated browser controller 108 indicating that the download of downloaded file 314 was detected, and may provide additional information to isolated browser controller 108 (e.g., a domain name of web application 340, a filename assigned by web application 340, a file extension, etc.).

Figure 8:
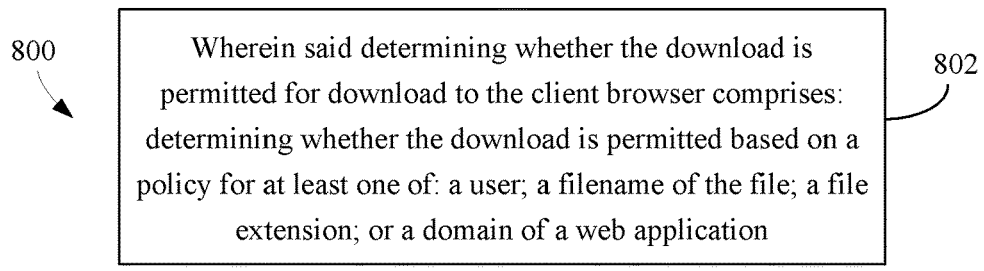
FIG. 8 is a flowchart of a method for determining whether a file is permitted for download to a client browser, according to an example embodiment.

Policy engine 320 may operate in various ways to perform its functions. For instance, FIG. 8 is a flowchart 800 of a method for determining whether a file is permitted for download to a client browser, according to an example embodiment. Flowchart 800 may be performed during step 404 of flowchart 400 (FIG. 4), for example. In an embodiment, policy engine 320 may operate according to flowchart 800. Flowchart 800 is described as follows with reference to FIGS. 1 and 3.

Flowchart 800 includes step 802. In step 802, determining whether the download is permitted for download to the client browser comprises: determining whether the download is permitted based on a policy for at least one of: a user, a filename of the file, a file extension, or a domain of a web application. For example, policy engine 320 may be configured to determine whether downloaded file 314, which was downloaded from web application 340 to isolated browser engine 312, is permitted to be downloaded to client browser 330. Policy engine 320 may utilize one or more criteria to determine whether downloaded file 314 is permitted to be downloaded to client browser 330. Some examples of the criteria include permissions associated with a user such as a user that requested the file download at client device 104, permissions for particular files or file types, which may be indicated by a file name or file extension of downloaded file 314, the origin of downloaded file 314 that may be indicated by the domain of web application 340, which served the file to isolated browser engine 312. In some embodiments, a user (e.g., an administrator) may configure download policy parameters in isolated browser 330, which may be utilized by policy engine 320 to determine whether the download of downloaded file 314 to client browser 330 is allowed or blocked.

As described above, in instances when policy engine 320 determines that a file download is permitted, isolated browser controller 108 may transmit downloaded file 314 to client browser 330. In instances when policy engine 320 determines that a file download is not permitted, isolated browser controller 108 may delete downloaded file 314 and transmit an event to client browser 330 indicating that the download of downloaded file 314 to client browser 330 has been blocked. The event may indicate that the download was blocked due to a policy and/or may indicate which policy prevented the download.

Figure 9:
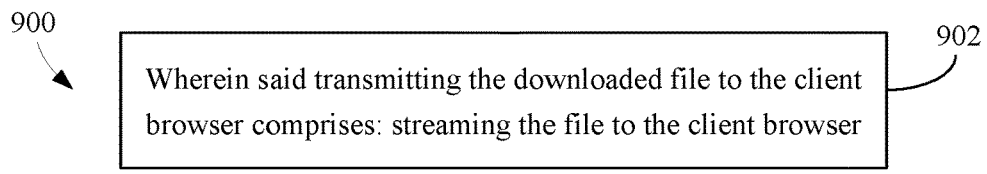
FIG. 9 is a flowchart of a method for streaming a file from an RBI server to a client browser, according to an example embodiment.

Browser controller 108 may operate in various ways to perform its functions. For instance, FIG. 9 is a flowchart 900 of a method for streaming a file from an RBI server to a client browser, according to an example embodiment. Flowchart 900 may be performed during step 408 of flowchart 400 (FIG. 4), for example. In an embodiment, browser controller 108 may operate according to flowchart 900. Flowchart 900 is described as follows with reference to FIGS. 1 and 3.

Flowchart 900 includes step 902. In step 902, transmitting the downloaded file to the client browser comprises streaming the file to the client browser. For example, in instances when policy engine 320 determines that downloaded file 314 is permitted to be downloaded to client browser 330, file handler 322 may be configured to transmit downloaded file 314 to client browser 330. In some embodiments, file handler 322 may transmit data of downloaded file 314 to client browser 330 in a stream of bytes (e.g., as binary data) via a streaming protocol. The streaming protocol may comprise, for example, real-time streaming protocol (RTSP), real-time transport protocol (RTP), real-time transport control protocol (RTCP), etc. File download simulator 334 in client device 104 may be configured to initiate or programmatically create a download at client browser 330 for the data of downloaded file 314. For example, JavaScript of download simulator 334 may be configured to simulate a file download using object URLs. In this regard, download simulator 334 may utilize a JavaScript function (e.g., "createObjectURL( )") that may accept a JavaScript copy of downloaded file 314 data, in some representation such as a binary large object (BLOB), and create a URL that is manufactured for this particular set of data at client device 104. The created URL may be browsed to or selected via a user interaction (e.g., mouse click, screen touch, etc.) to initiate the download of downloaded file 314 at client browser 330.

Figure 10:
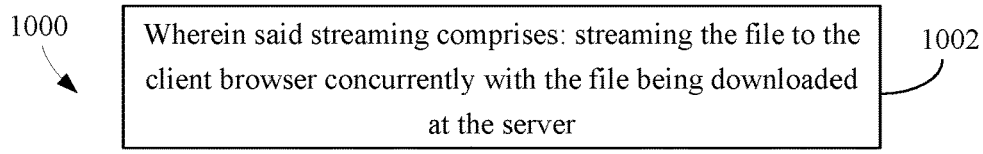
FIG. 10 is a flowchart of a method for streaming a file from an RBI server to a client browser, according to an example embodiment.

Browser controller 108 may operate in various ways to perform its functions. For instance, FIG. 10 is a flowchart 1000 of a method for streaming a file from an RBI server to a client browser, according to an example embodiment. Flowchart 1000 may be performed during step 408 of flowchart 400 (FIG. 4), for example. In an embodiment, browser controller 108 may operate according to flowchart 1000. Flowchart 1000 is described as follows with reference to FIGS. 1 and 3.

Flowchart 1000 includes step 1002. In step 1002, the streaming of the file to the client browser comprises streaming the file to the client browser concurrently with the file being downloaded at the server. For example, as described above, isolated browser engine 312 may establish a session with web application 340 and download a file from web application 340 based on a request from client browser 330. Isolated browser engine 312 may transmit an event to isolated browser controller 108 indicating that downloading of downloaded file 314 was detected. File handler 322 may be configured to transmit downloaded file 314 to client browser 330 if policy engine 320 has determined that downloaded file 314 is permitted to be downloaded to client browser 330. In some embodiments, policy engine 320 may determine that the file is permitted to be downloaded to client browser 330 either before the file is downloaded to isolated browser engine 312 or during the downloading of the file to isolated browser engine 312. For example, once a request for a file download is received from client browser 330, which may include an identity of the requested file and/or the domain of the web application 340, policy engine 320 may determine whether the download of the file to client browser 330 is permitted. As isolated browser engine 312 receives the file from web application 340, file handler 322 (or isolated browser engine 312) may concurrently transmit or stream the portions of the file that have been downloaded to isolated browser 312 to client browser 330. Alternatively or in addition, policy engine 320 may determine that the download of the file to client browser 330 is permitted after web application 340 has begun to transmit the file to isolated browser engine 312 and before the downloading of the file to isolated browser engine 312 has completed. Once policy engine 320 has determined that downloading of the file to client browser 330 is permitted, isolated browser engine 312, or file handler 322, may concurrently transmit or stream the portions of the file that have been downloaded to isolated browser 312 to client browser 330.

Figure 11:
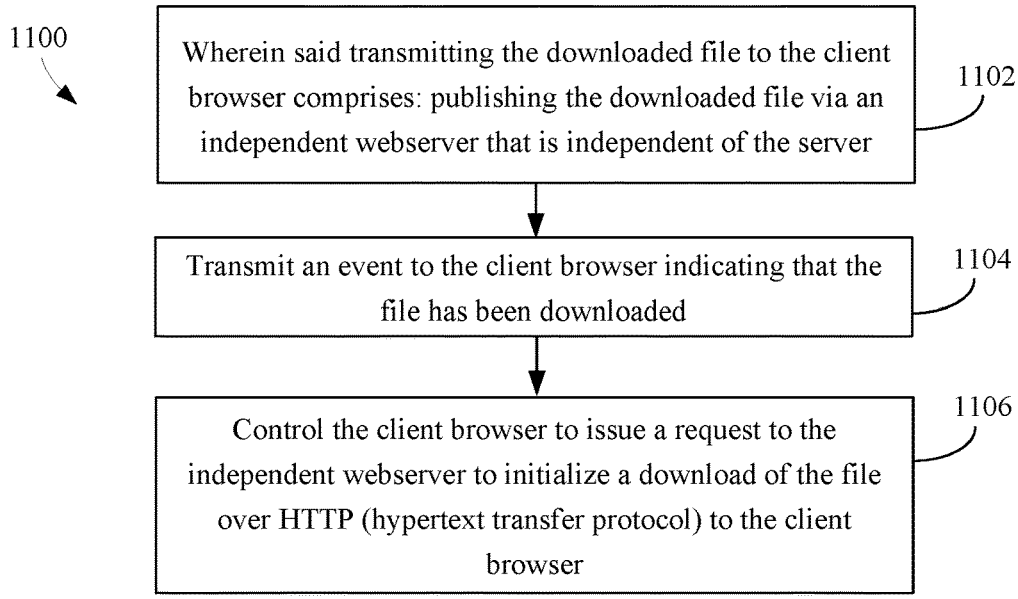
FIG. 11 is a flowchart of a method for streaming a file from an RBI server to a client browser, according to an example embodiment.

Browser controller 108 may operate in various ways to perform its functions. For instance, FIG. 11 is a flowchart 1100 of a method for streaming a file from an RBI server to a client browser, according to an example embodiment. Flowchart 1100 may be performed during step 408 of flowchart 400 (FIG. 4), for example. In an embodiment, browser controller 108 may operate according to flowchart 1100. Flowchart 1100 is described as follows with reference to FIGS. 1 and 3.

Flowchart 1100 begins with step 1102. In step 1102, transmitting of the downloaded file to the client browser comprises publishing the downloaded file via an independent webserver that is independent of the server. For example, in instances when policy engine 320 determines that downloaded file 314 is permitted to be downloaded to client browser 330, file handler 322 may be configured to publish downloaded file 314 over a separate web server such as independent sever server 350, which may be independent of web server 106 and/or RBI server 102.

In step 1104, an event is transmitted to the client browser indicating that the file has been downloaded. For example, client controller 324 may be configured to transmit an event to client browser 330 to notify client browser 330 that downloaded file 314 is available for downloading from independent web server 350.

In step 1106, the client browser may be controlled to issue a request to the independent webserver to initialize a download of the file over HTTP (hypertext transfer protocol) to the client browser. For example, client controller 324 may be configured to control file download event handler 336 of client browser 330 to issue a request (e.g., over HTTP) to independent web server 350 to download downloaded file 314 to client browser 330 from independent web server 350.

Figure 12:
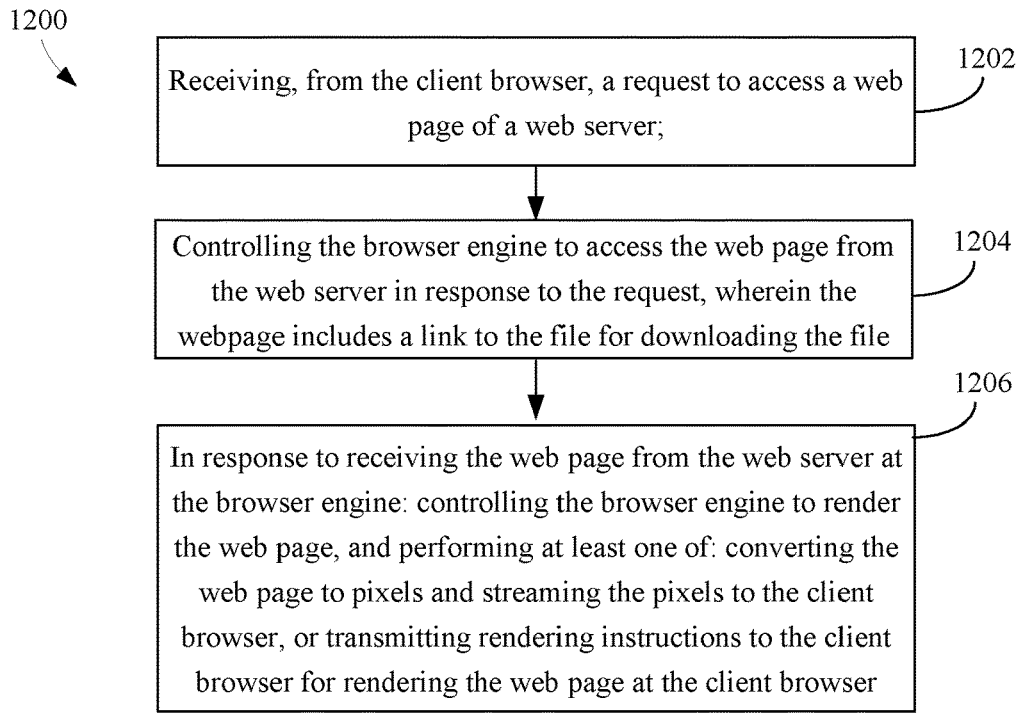
FIG. 12 is a flowchart of a method in an RBI server for controlling file downloads to a client browser, according to an example embodiment.

Isolated browser 310 may operate in various ways to perform its functions. For instance, FIG. 12 is a flowchart 1200 of a method in an RBI server for controlling file downloads to a client browser, according to an example embodiment. Flowchart 1200 may be performed as part of flowchart 400 (FIG. 4), such as before step 402 and/or independent of flowchart 400. In an embodiment, Isolated browser 310 may operate according to flowchart 1200. Flowchart 1200 is described as follows with reference to FIGS. 1 and 3.

Flowchart 1200 begins with step 1202. In step 1202, a request to access a web page of a web server is received from the client browser. For example, RBI server 102 may be configured to receive an HTTP request from client browser 330. The HTTP request may request access to content such as a web page (e.g., a webmail web page) provided by web application 340 of web server 106. Isolated browser controller 108 may or may not evaluate the HTTP request against access policies.

In step 1204, the browser engine is controlled to access the web page from the web server in response to the request, where the webpage includes a link to the file for downloading the file. For example, web server 106 may be configured to store, process, and deliver web pages that may comprise HTML documents with scripts, style sheets, images, and/or text to isolated browser engine 312. Web server 106 may host web application 340 (e.g., webmail, online retail sales, online banking, etc.) that may be accessed by browser engine 312 on behalf of client browser 330, and may provide web services to client browser 330 via RBI server 102. Isolated browser controller 108 may control isolated browser engine 312 to create an isolated browser session, connect to web application 340, and load the requested web page onto the remote isolated browser 310. The web page may comprise a link to a file (e.g., a PDF document or another file) for downloading the file (e.g., downloaded file 314) from web application 340 to client browser 330.

In step 1206, in response to receiving the web page from the web server at the browser engine: the browser engine is controlled to render the web page, and perform at least one of: converting the web page to pixels and streaming the pixels to the client browser, or transmitting instructions to the client browser for rendering the web page at the client browser. For example, isolated browser controller 108 may be configured to control isolated browser engine 312 to render the loaded web page. In response, isolated browser engine 312 may be configured to render the loaded web page (e.g., comprising HTML, JavaScript, CSS, etc.) and convert the web page to pixels that may form an image that looks like the web page when displayed at client device 104. In some embodiments, isolated browser controller 108 may be configured to stream the pixels (e.g., over HTML5, Unreal Engine, etc.) to client browser 330. Client browser 330 may receive the streamed pixels from isolated browser controller 108, and pixel stream renderer 332 may render the received pixels and display the pixels to form the image of the rendered web page in a display screen of client device 106. Alternatively, or in addition, isolated browser controller 108 may transmit instructions for rendering the pixels of the web page to client browser 330, and client browser 330 may display the pixels that form the image of the web page based on the instructions.

In some embodiments, isolated browser controller 108 may also transmit JavaScript code that may be used to capture user interactions at pixels displaying the image of the web page in client browser 330. For example, when a user interacts (e.g., via mouse clicks or touch screen input) with the pixel display at x, y coordinates of the image of the web page where the pixels represent the link for downloading the file (e.g., a PDF file), client browser 330 may transmit the x, y coordinates to isolated browser controller 108. Isolated browser controller 108 may map the x, y coordinates to the link for downloading the file in the web page, and control isolated browser engine 312 to send a URL corresponding to the link to web application 340 to request a file download to receive downloaded file 314.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100 and 400 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 13:
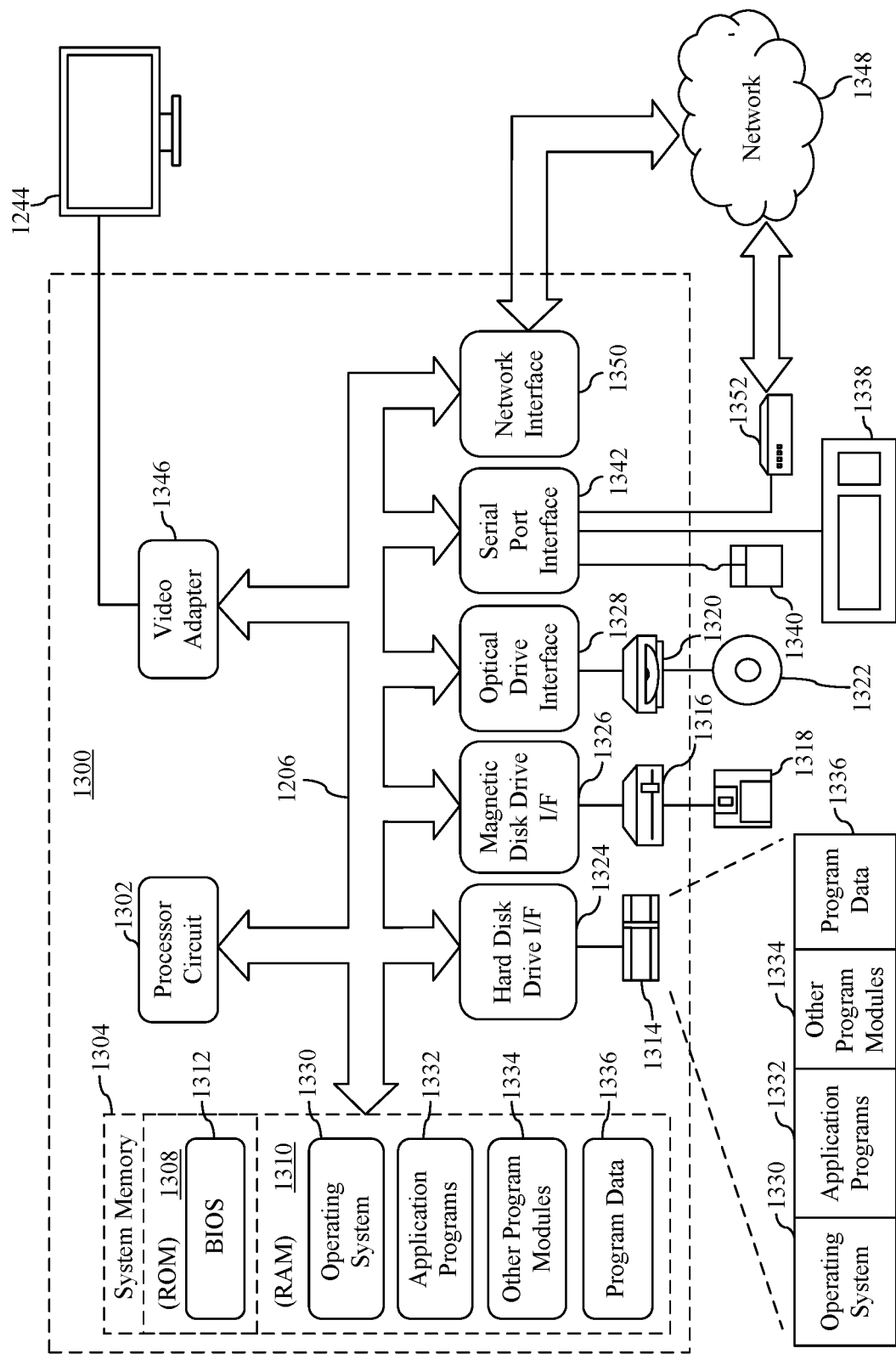
FIG. 13 is a block diagram of an example processor-based computer system that may be used to implement various embodiments.

FIG. 13 is a block diagram of an example processor-based computer system 1300 that may be used to implement various embodiments. RBI server 102, client device 104, web server 106, and independent web server 350 may include any type of computing device, mobile or stationary, such as a desktop computer, a server, a video game console, etc. For example, RBI server 102, client device 104, web server 106, and independent web server 350 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

RBI server 102, client device 104, web server 106, and independent web server 350, may each be implemented in one or more computing devices containing features similar to those of computing device 1300 in stationary or mobile computer embodiments and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing RBI server 102, client device 104, web server 106, independent web server 350, isolated browser 310, isolated browser engine 312, isolated browser controller 108, policy engine 320, client controller 324, file handler 322, client browser 330, pixel stream renderer 332, file download simulator 334, file download event handler 336, web application 340, any one or more of flowcharts 200, 400, 500, 600, 700, 800, 900, 1000, 1100, 1200 (including any step thereof), and/or further embodiments described herein. Program data 1336 may include, downloaded file 314, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system in a server for downloading a file, on behalf of a client browser, via an isolated browser of the server includes one or more processors and one or more memory devices that store program code to be executed by the one or more processors. The program code comprises an isolated browser controller configured to receive from a browser engine of the isolated browser an indication that a download of the file by the browser engine at the server was detected, where the downloaded file is saved at the server. The isolated browser controller is further configured to determine whether the file is permitted for download by the client browser. Responsive to determining that the file is not permitted for download by the client browser, the isolated browser controller is configured to delete the downloaded file at the server, and transmit a policy event to the client browser. Responsive to determining that the file is permitted for download by the client browser, the isolated browser controller is configured to transmit the downloaded file to the client browser.

In an embodiment of the foregoing system, the isolated browser controller is further configured to configure the browser engine to listen to file download events on behalf of the client browser.

In an embodiment of the foregoing system, the isolated browser controller is further configured to: prior to said receiving from the browser engine an indication that a download of the file by the browser engine at the server was detected, receive a request for the file from the client browser.

In an embodiment of the foregoing system, the browser engine of the server is configured to: transmit a request for the file, and receive the file from a remote web server in response to the request.

In an embodiment of the foregoing system, the isolated browser controller is further configured to determine whether the file is permitted for download by the client browser based on a policy for at least one of: a user, a filename of the file, a file extension, or a domain of a web application.

In an embodiment of the foregoing system, the isolated browser controller is further configured to stream the file to the client browser.

In an embodiment of the foregoing system, said streaming comprises streaming the file to the client browser concurrently with the file being downloaded at the server.

In an embodiment of the foregoing system, the isolated browser controller is further configured to: publish the downloaded file via an independent web server that is independent of the server, transmit an event to the client browser indicating that the file has been downloaded, and control the client browser to issue a request to the independent web server to initialize a download of the file over HTTP (hypertext transfer protocol) to the client browser.

In an embodiment of the foregoing system, the isolated browser controller is further configured to, prior to receipt from the browser engine of the indication that a download of the file by the browser engine at the server was detected: receive, from the client browser, a request to access a web page from a web server, control the browser engine to access the web page from the web server in response to the request, wherein the webpage includes a link to the file for downloading the file, and in response to receipt of the web page from the web server at the browser engine, control the browser engine to render the web page and perform at least one of: convert the web page to pixels and stream the pixels to the client browse, or transmit rendering instructions to the client browser for rendering the web page at the client browser.

In an embodiment, a method in a server for downloading a file, on behalf of a client browser, via an isolated browser of the server includes receiving from a browser engine of the isolated browser an indication that a download of the file by the browser engine at the server was detected, where the downloaded file is saved at the server. The method further includes determining whether the file is permitted for download by the client browser. Responsive to determining that the file is not permitted for download by the client browser, the method further includes deleting the downloaded file at the server, and transmitting a policy event to the client browser. Responsive to determining that the file is permitted for download by the client browser, the downloaded file is transmitted to the client browser.

In an embodiment of the foregoing method, the browser engine is configured to listen to file download events on behalf of the client browser.

In an embodiment of the foregoing method, prior to said receiving from the browser engine an indication that a download of the file by the browser engine at the server was detected, a request for the file is received from the client browser.

In an embodiment of the foregoing method, a request for the file is transmitted by the browser engine, and the file is received from a remote web server in response to the request.

In an embodiment of the foregoing method, said determining whether the file is permitted for download to the client browser comprises determining whether the download is permitted based on a policy for at least one of: a user, a filename of the file, a file extension, or a domain of a web application.

In an embodiment of the foregoing method, said transmitting the downloaded file to the client browser comprises streaming the file to the client browser.

In an embodiment of the foregoing method, said streaming comprises streaming the file to the client browser concurrently with the file being downloaded at the server.

In an embodiment of the foregoing method, said transmitting the downloaded file to the client browser comprises: publishing the downloaded file via an independent web server that is independent of the server, transmitting an event to the client browser indicating that the file has been downloaded, and controlling the client browser to issue a request to the independent web server to initialize a download of the file over HTTP (hypertext transfer protocol) to the client browser.

In an embodiment of the foregoing method, the method further comprises, prior to receiving from the browser engine the indication that a download of the file by the browser engine at the server was detected: receiving, from the client browser, a request to access a web page of a web server, and controlling the browser engine to access the web page from the web server in response to the request, wherein the webpage includes a link to the file for downloading the file. In response to receiving the web page from the web server at the browser engine the method further comprises controlling the browser engine to render the web page, and performing at least one of: converting the web page to pixels and streaming the pixels to the client browser, or transmitting rendering instructions to the client browser for rendering the web page at the client browser.

In an embodiment, a remote browser isolation system in a server for downloading a file on behalf of a client browser includes one or more processors, and one or more memory devices that store program code to be executed by the one or more processors. The program code comprises a remote isolated browser of the server configured to: access a web page on behalf of the client browser, stream pixels representing an image of the web page to the client browser, and download a file from a web server on behalf of the client browser. The program code further comprises an isolated browser controller configured to: receive from a browser engine of the remote isolated browser an indication that the downloaded file was received, and determine whether download of the file to the client browser is permitted. Responsive to determining that a download of the file to the client browser is not permitted, the isolated browser controller is further configured to transmit a download block notification to the client browser. Responsive to determining that the download of the file to the client browser is permitted, the isolated browser controller is further configured to transmit the downloaded file to the client browser.

In an embodiment of the foregoing system, the isolated browser controller is further configured to determine whether the download of the file to the client browser is permitted based on a policy for at least one of: a user, a filename of the file, a file extension, or a domain of a web application.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system in a remote server for downloading a file on behalf of a client browser, the system including:
 a processor; and
 a memory device that stores program code to be executed by the processor, the program code comprising:
  an isolated browser controller of an isolated browser in the remote server; and
  an isolated browser engine of the isolated browser that downloads a file from a remote web server, detects the file download, and transmits an event to the isolated browser controller indicating detection of the file download at the remote server;
  the isolated browser controller:
   receives from the isolated browser engine the indication of detection of the file download at the remote server;
   determines whether downloading the file to the client browser is permitted; and
   responsive to determining that downloading the file to the client browser is permitted, transmits the file to the client browser, wherein the isolated browser controller streams the file to the client browser by streaming the file to the client browser concurrently with the file being downloaded at the remote server.

2. The system of claim 1, wherein the isolated browser controller further:
 configures the isolated browser engine to listen to file download events at the remote server on behalf of the client browser.

3. The system of claim 1, wherein the isolated browser controller further:
 prior to said receives from the isolated browser engine the indication of detection of the file download at the remote server, receives a request for the file from the client browser.

4. The system of claim 1, wherein the isolated browser engine of the remote server further:
 transmits a request for the file; and
 receives the file from the remote web server in response to the request.

5. The system of claim 1, wherein the isolated browser controller determines whether downloading the file to the client browser is permitted based on a policy configured in the remote server for at least one of:
 a user;
 a filename of the file;
 a file extension; or
 a domain of a web application.

6. The system of claim 1, wherein the isolated browser controller:
 prior to receiving from the isolated browser engine the indication of detection of the file download at the remote server:
  receives, from the client browser, a request to access a web page from a web server;
  controls the isolated browser engine to access the web page from the web server in response to the request, wherein the webpage includes a link to the file for downloading the file; and
  in response to receipt of the web page from the web server at the isolated browser engine, performs at least one of:
   control the isolated browser engine to render the web page, convert the web page to pixels, and stream the pixels to the client browser; or
   transmit rendering instructions to the client browser for rendering the web page at the client browser.

7. A method in a remote server for downloading a file on behalf of a client browser, the method including:
 detecting, by an isolated browser engine in a remote server, a file download at the remote server, transmitting, by the isolated browser engine in the remote server, an event to an isolated browser controller in the remote server indicating detection of the file download;
 receiving, from the isolated browser engine, the indication of detection of the file download at the remote server;
 determining whether downloading the file to the client browser is permitted; and
 responsive to determining that downloading the file to the client browser is permitted, transmitting the file to the client browser, wherein said transmitting the file to the client browser comprises:
  streaming the file to the client browser concurrently with the file being downloaded at the remote server.

8. The method of claim 7, further comprising:
 configuring the isolated browser engine to listen to file download events at the remote server on behalf of the client browser.

9. The method of claim 7, further comprising:
 prior to said receiving from the isolated browser engine the indication of detection of the file download at the remote server, receiving a request for the file from the client browser.

10. The method of claim 7, further comprising:
 transmitting a request for the file by the isolated browser engine; and
 receiving the file from the remote web server in response to the request.

11. The method of claim 7, wherein said determining whether downloading the file to the client browser is permitted comprises:
 determining whether said downloading the file to the client browser is permitted based on a policy for at least one of:
  a user;
  a filename of the file;
  a file extension; or
  a domain of a web application.

12. The method of claim 7, further comprising:
 prior to said receiving from the isolated browser engine the indication of detection of the file download at the remote server:
  receiving, from the client browser, a request to access a web page of a web server;
  controlling the isolated browser engine to access the web page from the web server in response to the request, wherein the webpage includes a link to the file for downloading the file; and
  in response to receiving the web page from the web server at the isolated browser engine, performing at least one of:
   controlling the isolated browser engine to render the web page, convert the web page to pixels, and stream the pixels to the client browser; or
   transmit rendering instructions to the client browser for rendering the web page at the client browser.

13. A computer-readable storage medium that stores program code to be executed by a processor, the program code comprising:

an isolated browser controller of an isolated browser in the remote server; and
an isolated browser engine of the isolated browser that downloads a file from a remote web server, detects the file download, and transmits an event to the isolated browser controller indicating detection of the file download at the remote server;
the isolated browser controller:
receives from the isolated browser engine the indication of detection of the file download at the remote server;
determines whether downloading the file to the client browser is permitted; and
responsive to determining that downloading the file to the client browser is permitted, transmits the file to the client browser, wherein the isolated browser controller streams the file to the client browser by streaming the file to the client browser concurrently with the file being downloaded at the remote server.

14. The computer-readable storage medium of claim 13, wherein the isolated browser controller determines whether downloading the file to the client browser is permitted based on a policy configured in the remote server for at least one of:
a user;
a filename of the file;
a file extension; or
a domain of a web application.

15. A system in a remote server for downloading a file on behalf of a client browser, the system including:
a processor; and
a memory device that stores program code to be executed by the processor, the program code comprising:
an isolated browser controller of an isolated browser in the remote server; and
an isolated browser engine of the isolated browser that downloads a file from a remote web server, detects the file download, and transmits an event to the isolated browser controller indicating detection of the file download at the remote server;
the isolated browser controller:
receives from the isolated browser engine the indication of detection of the file download at the remote server;
determines whether downloading the file to the client browser is permitted; and
responsive to determining that downloading the file to the client browser is permitted, transmits the file to the client browser, wherein the isolated browser controller:
publishes the file via an independent web server that is independent of the remote server;
transmits an event to the client browser indicating that the file is available for downloading from the independent web server; and
controls the client browser to issue a request to the independent web server to initialize a download of the file over HTTP (hypertext transfer protocol) to the client browser.

16. The system of claim 15, wherein the isolated browser controller determines whether downloading the file to the client browser is permitted based on a policy configured in the remote server for at least one of:
a user;
a filename of the file;
a file extension; or
a domain of a web application.

17. A method in a remote server for downloading a file on behalf of a client browser, the method including:
detecting, by an isolated browser engine in a remote server, a file download at the remote server, transmitting, by the isolated browser engine in the remote server, an event to an isolated browser controller in the remote server indicating detection of the file download;
receiving, from the isolated browser engine, the indication of detection of the file download at the remote server;
determining whether downloading the file to the client browser is permitted; and
responsive to determining that downloading the file to the client browser is permitted, transmitting the file to the client browser, said transmitting the file to the client browser comprising:
publishing the file via an independent web server that is independent of the remote server;
transmitting an event to the client browser indicating that the file is available for downloading from the independent web server; and
controlling the client browser to issue a request to the independent web server to initialize a download of the file over HTTP (hypertext transfer protocol) to the client browser.

18. The method of claim 17, wherein said determining whether downloading the file to the client browser is permitted comprises:
determining whether said downloading the file to the client browser is permitted based on a policy for at least one of:
a user;
a filename of the file;
a file extension; or
a domain of a web application.

19. A computer-readable storage medium that stores program code to be executed by a processor, the program code comprising:
an isolated browser controller of an isolated browser in the remote server; and
an isolated browser engine of the isolated browser that downloads a file from a remote web server, detects the file download, and transmits an event to the isolated browser controller indicating detection of the file download at the remote server;
the isolated browser controller:
receives from the isolated browser engine the indication of detection of the file download at the remote server;
determines whether downloading the file to the client browser is permitted; and
responsive to determining that downloading the file to the client browser is permitted, transmits the file to the client browser, wherein the isolated browser controller:
publishes the file via an independent web server that is independent of the remote server;
transmits an event to the client browser indicating that the file is available for downloading from the independent web server; and
controls the client browser to issue a request to the independent web server to initialize a download of the file over HTTP (hypertext transfer protocol) to the client browser.

20. The computer-readable storage medium of claim 19, wherein the isolated browser controller determines whether downloading the file to the client browser is permitted based on a policy configured in the remote server for at least one of:
  a user;
  a filename of the file;
  a file extension; or
  a domain of a web application.

\* \* \* \* \*